United States Patent [19]

Teremy et al.

[11] Patent Number: 5,652,930
[45] Date of Patent: Jul. 29, 1997

[54] CAMERA INFORMATION DISPLAY

[75] Inventors: Paul Teremy, Rochester; David Reynolds Dowe, Holley; Wilbert Frank Janson, Jr., Shortsville; James Vergil Leavy, Churchville; Dale Frederick McIntyre, Honeoye Falls, all of N.Y.

[73] Assignee: Eastman Kodak Company, Rochester, N.Y.

[21] Appl. No.: 388,094

[22] Filed: Feb. 14, 1995

Related U.S. Application Data

[63] Continuation-in-part of Ser. No. 357,636, Dec. 16, 1994, abandoned.

[51] Int. Cl.$^6$ ........................................ G03B 17/00
[52] U.S. Cl. ............................................ 396/287
[58] Field of Search ................................ 354/219, 222, 354/289.1, 289.11, 289.12, 465, 468, 471–475; 428/457, 690, 313; 313/504; 396/281, 287, 292, 535, 540, 541

[56] References Cited

U.S. PATENT DOCUMENTS

| | | | |
|---|---|---|---|
| 4,279,481 | 7/1981 | Ishibashi et al. | 352/171 |
| 4,356,229 | 10/1982 | Brodnyan et al. | 428/288 |
| 4,529,290 | 7/1985 | Kobori et al. | 354/442 |
| 4,684,353 | 8/1987 | deSouza | 445/51 |
| 4,717,936 | 1/1988 | Shimizu et al. | 354/471 |
| 4,720,432 | 1/1988 | VanSlyke et al. | 428/457 |
| 4,769,292 | 9/1988 | Tang et al. | 428/690 |
| 4,885,211 | 12/1989 | Tang et al. | 428/457 |
| 4,900,831 | 2/1990 | Chen et al. | 546/66 |
| 4,908,603 | 3/1990 | Yamaue et al. | 340/525 |
| 4,912,499 | 3/1990 | Desormeaux | 354/468 |
| 4,948,893 | 8/1990 | Chen et al. | 546/66 |
| 4,948,895 | 8/1990 | Chen et al. | 546/196 |
| 4,950,950 | 8/1990 | Perry et al. | 313/504 |
| 4,973,694 | 11/1990 | Chen et al. | 546/66 |
| 4,977,425 | 12/1990 | Yamamoto et al. | 354/474 |
| 4,996,523 | 2/1991 | Bell et al. | 340/781 |
| 4,999,665 | 3/1991 | Kuroda et al. | 354/468 |
| 5,047,687 | 9/1991 | VanSlyke | 313/503 |
| 5,059,861 | 10/1991 | Littman et al. | 313/503 |
| 5,059,862 | 10/1991 | VanSlyke et al. | 313/503 |
| 5,061,569 | 10/1991 | VanSlyke et al. | 428/457 |
| 5,126,214 | 6/1992 | Tokailin et al. | 428/690 |
| 5,141,671 | 8/1992 | Bryan et al. | 252/301.16 |
| 5,150,006 | 9/1992 | Van Slyke et al. | 313/504 |
| 5,151,629 | 9/1992 | VanSlyke | 313/504 |
| 5,172,156 | 12/1992 | Tsuru et al. | 354/409 |
| 5,245,381 | 9/1993 | Takagi et al. | 354/471 |
| 5,276,380 | 1/1994 | Tang | 313/504 |
| 5,294,869 | 3/1994 | Tang et al. | 313/504 |
| 5,294,870 | 3/1994 | Tang et al. | 313/504 |
| 5,432,578 | 7/1995 | Suzuki | 354/289.12 |

FOREIGN PATENT DOCUMENTS

WO92/16023  9/1992  WIPO .................. H01L 33/00

*Primary Examiner*—Howard B. Blankenship
*Attorney, Agent, or Firm*—Charles E. Snee, III; David A. Howley

[57] ABSTRACT

A photographic camera is provided with a display including organic electroluminescent material energizable in patterns representing camera information. The patterns are defined by electrically isolated illumination elements that are controlled to emit light by selectively applying a voltage to the elements forming the desired pattern. The material may be chosen to emit light in different colors representing levels of concern associated with camera conditions. Certain features provide a display having an in-line array of alpha-numeric character generators comprising a matrix of closely spaced illumination elements and a control for energizing selected combinations of the elements to emit light collectively defining alpha-numeric characters. Display brightness can be adjusted by changing the applied power as a function of the ambient light conditions to enhance viewability of the display.

8 Claims, 6 Drawing Sheets

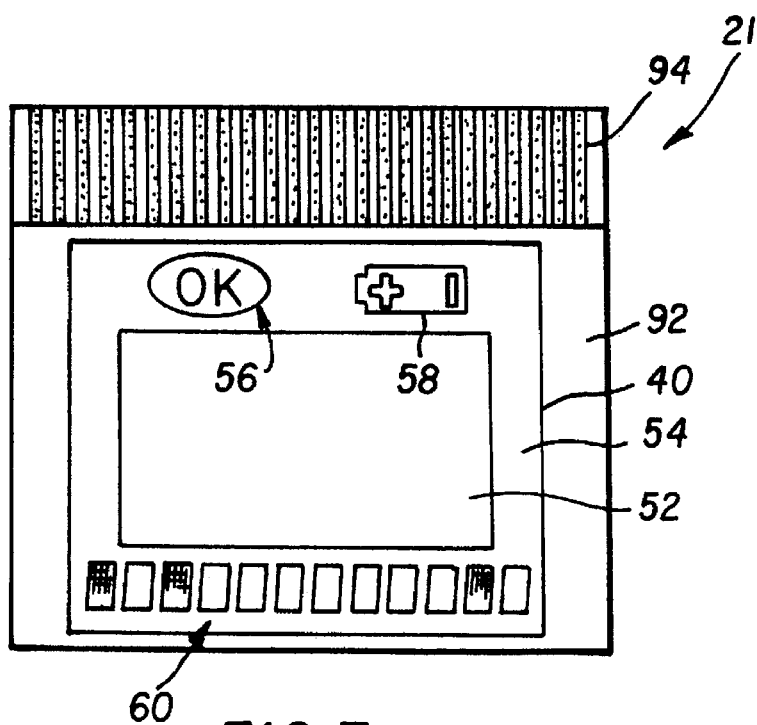
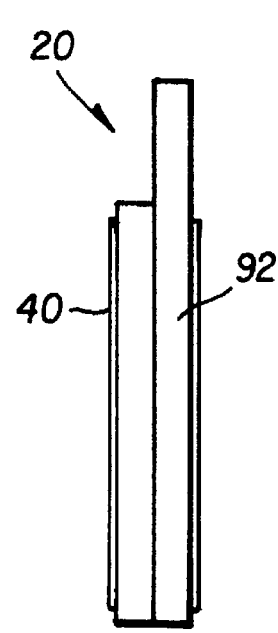
FIG. 7    FIG. 8
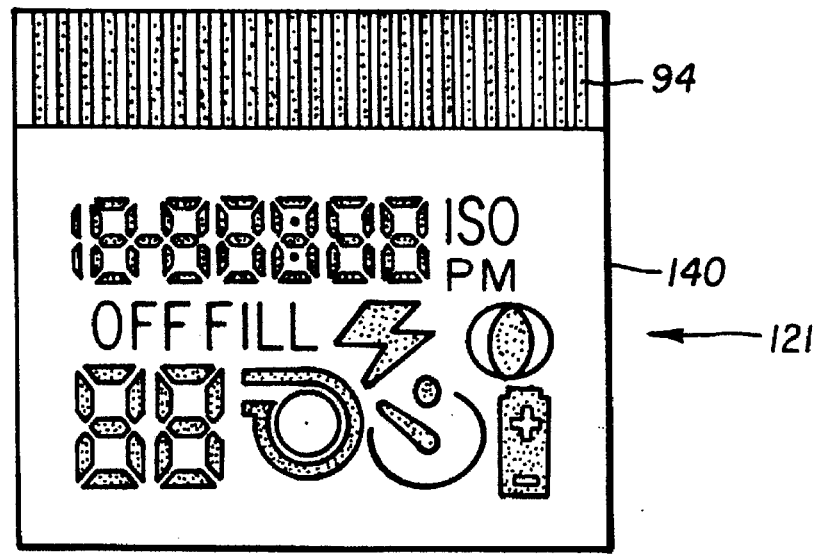
FIG. 9

CAMERA INFORMATION DISPLAY

CROSS REFERENCE TO RELATED APPLICATIONS

This application is a continuation in part of our commonly assigned, patent application Ser. No. 08/357,636, entitled Camera Information Display, filed on Dec. 16, 1994, in the names of Paul Teremy, David R. Dowe, Wilbert F. Janson, Jr. and James V. Leavy, and now abandoned.

Reference also is made to commonly assigned, copending U.S. patent applications Ser. No. 08/311,619, entitled AC Drive Scheme For Organic LED, filed on Sep. 23, 1994, in the names of Ching Wan Tang and Steven A. VanSlyke;, now U.S. Pat. No. 5,552,678 and Ser. No. 08/146,347, entitled Camera For Recording Digital And Pictorial Images On Photographic Film, filed Oct. 29, 1993, in the names of Gilbert A. Hawkins and Jose Mir, now U.S. Pat. No. 5,389,989. The disclosures of both referenced applications hereby are incorporated into the present specification.

BACKGROUND OF THE INVENTION

1. Field of Invention

The invention relates to photography, and more specifically to cameras including information displays for visually presenting information pertaining to photographic conditions.

2. Description of the Prior Art

Many cameras include information displays that are visible either in the viewfinder or from the camera exterior for reporting on camera and photographic conditions. Typical approaches include illuminated masks, liquid crystal displays (LCDs) and seven segment light emitting diodes (LEDs) .

Kobori et al. U.S. Pat. No. 4,529,290, is an example of the first type, disclosing a translucent template supporting opaque letters over light emitting diodes (LEDs). The LEDs are energized selectively to illuminate one or more of the letters depending on alternative camera settings. According to this approach, the information is contained on a mask, typically supporting letters or symbols, while selectable light sources identify and illuminate the information to be communicated. Yamamoto et al. U.S. Pat. No. 4,977,425 appears to use this same approach with icon masks that are supported over selectively energized LEDs. According to Yamamoto, the icons are divided into cooperating parts that communicate different messages depending on which parts or combinations are energized. The icons may be different colors, such as blue and red, representing proper and improper exposure conditions, respectively. They also may include letters that spell out words. Still other masking examples use neon lights for illumination or natural light collected from the scene and directed to or through the mask.

The above-mentioned Yamamoto patent also suggests the second display type, including discrete liquid crystal elements shaped in patterns that are energized selectively to represent camera conditions. According to this approach the liquid crystal elements are substituted for the mask and the information to be communicated is selected by energizing the desired elements. Supplemental illumination may be provided, but is not usually part of the information selecting process.

The third display type is represented by the disclosure of Shimizu et al. U.S. Pat. No. 4,717,936, which includes a linear array of seven-segment LED devices. Each device can be activated to produce alternative numbers from zero to nine, and multiple devices can present additional digits. There is no mask. Instead, illumination elements, such as LED segments or neon tubes, are energized selectively to present information indicative of photographic conditions.

PROBLEM SOLVED BY THE INVENTION

Displays that employ illuminated masks are relatively inflexible and bulky. Individually selectable mask elements must be isolated from other independent elements to prevent illumination spillover. Numerous relatively expensive light sources or controls usually are required, and battery drain is undesirably high. Masking approaches are not well suited for presenting substantial amounts of information in confined areas, such as viewfinder displays reporting on a wide variety of camera functions or including operating instructions.

LCDs offer many advantages, particularly relating to size, shape and current drain, but do not produce illumination. Night viewing requires a supplemental light source, usually an LED or neon bulb, more than making up for the low current requirements of the LCD. Any supplemental illumination is in addition to the normal LCD structure, increasing the cost, number of separate parts and required space.

Direct reading LEDs have pertinent characteristics that are almost the opposite of LCDs. They produce their own light, but available shapes are limited, and current requirements are relatively high. Although in-line arrays of seven segment devices are flexible for presenting alpha-numeric characters, they are expensive, draw too much current for many camera applications and are not well suited for high resolution requirements or the intricate shapes of some icons.

Most existing camera displays are flat, limiting their location to a correspondingly flat camera surface, or preventing conformance of the display to a curved camera surface. Although relatively thin displays can be manufactured with some contour from LCDs, the problem is much more difficult with LEDs and other light emitting devices, particularly when the display is relatively large and thin.

Light emitting devices can be difficult to view under extreme ambient light conditions. For example, under very bright conditions, the light emitting device can be overwhelmed by the ambient light and not be viewable. Conversely, in low light conditions the light from one light emitting element can bleed over the light from another light emitting element, blurring alpha-numeric characters. Such a relatively bright display under low light conditions also wastes electrical power.

SUMMARY OF THE INVENTION

The present invention is directed to overcoming one or more of the problems set forth above. Briefly summarized, according to one aspect of the invention, a photographic camera is provided with an information display and control that combines the advantages of LEDs and LCDs while eliminating most of their disadvantages. The display includes organic electroluminescent material selectively energizable with applied voltages to luminesce in patterns representing camera information. The patterns are defined by electrically isolated illumination elements and are controlled to emit light by selectively applying a voltage to one or more of the elements in the desired pattern. Intensities can be adjusted to optimize the display contrast relative to a scene in the viewfinder or ambient light around a panel display. According to more specific features, the patterns include electroluminescent material chosen to emit light in different colors representing levels of concern associated with camera conditions.

Certain features of the invention provide a display having an in-line array of alpha-numeric character generators comprising a matrix of closely spaced illumination elements and a control for energizing selected combinations of the elements to emit light collectively defining alpha-numeric characters. More specifically, the control alternately energizes different combinations of the illumination elements so each matrix can define different alpha-numeric characters. Each illumination element includes a layer of organic electroluminescent material that is energized to luminesce by an applied voltage.

Other features of the invention provide a thin information display that is contoured to conform to a non-planar camera surface. The display includes a substrate supporting organic electroluminescent material selectively energizable in patterns to display information. The electroluminescent material is deposited on a curved substrate shaped to conform to the camera surface, or on a flexible support that is applied to a correspondingly curved surface.

Displays according to the invention are compact, and produce relatively high levels of brightness with fine resolution at low current levels. They are straight forward and inexpensive to manufacture in small thin packages on a single substrate with multi-color capabilities. They are particularly well suited to meet the demand in cameras for presenting numerous messages in a small space, such as a viewfinder.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIGS. 7 and 8 are front and side views of the information display panel depicting its flat configuration and board mounting structure.

FIG. 9 is a front view of a first alternative information display depicting alternative patterns of icons and alpha-numeric characters.

DESCRIPTION OF THE PREFERRED AND ALTERNATIVE EMBODIMENTS

Figure 1:
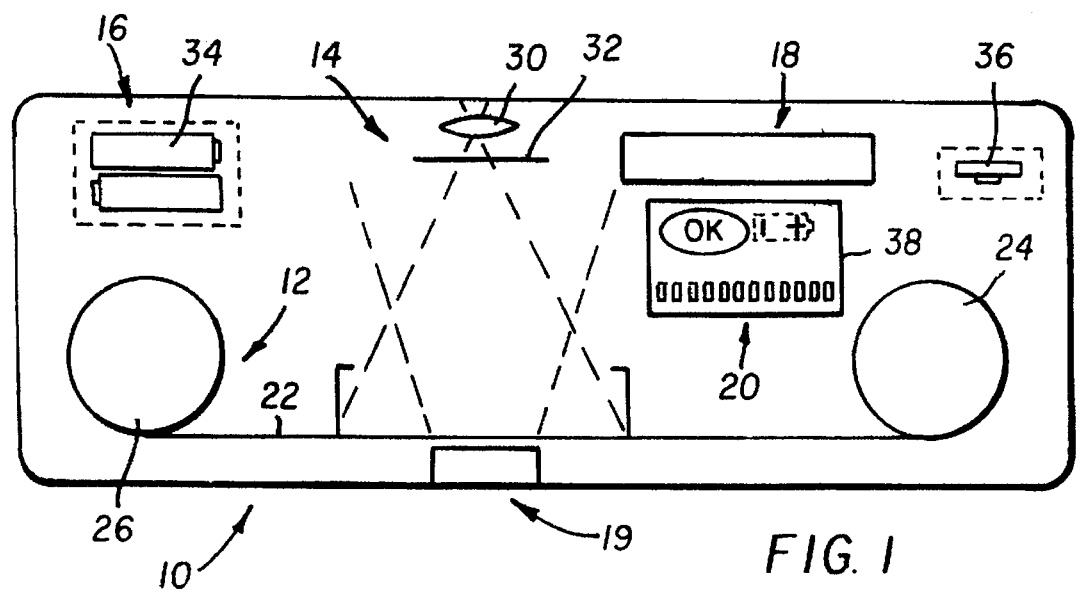
FIG. 1 is a schematic view of a camera including information displays on an exterior camera surface and internally in a viewfinder, both according to a preferred embodiment of the invention.
Figure 2:
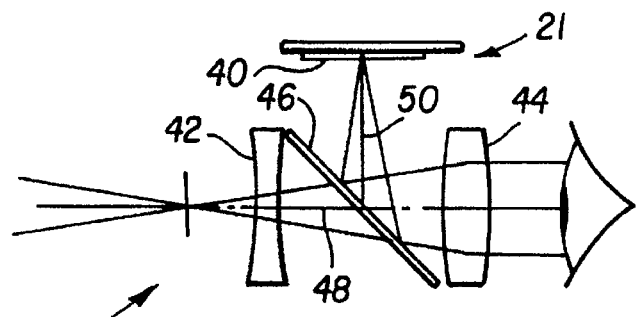
FIG. 2 is a partial side elevation of a camera viewfinder including a display according to the preferred embodiment.

Referring now to the drawings, beginning with FIGS. 1–4, a preferred embodiment of the invention is disclosed in a camera 10, including film advancing mechanism 12, exposure mechanism 14, power source 16, logic and control unit 18, viewfinder 19, and information displays 20 (FIG. 1) and 21 (FIG. 2).

Film advancing mechanism 12 operates in a known manner to meter movement of film 22 from supply chamber 24 across an exposure position to take-up chamber 26. The exposure mechanism 14 also is known, and includes appropriate optics 30 and shutter 32 for exposing the film 22 to an intended scene. Power source 16 includes two sets of batteries 34 and 36, one providing a DC voltage source for most camera operations and the other providing back-up for logic and memory functions when the first set is replaced or otherwise switched off.

Information displays 20 and 21 include panels 38 and 40, respectively, that are similar in many respects and will be described together throughout this specification, primarily in connection with panel 40. There are differences, however, based on the locations of the panels and their relative size. Panel 38 is coupled to the camera casing and is directly visible from the camera exterior. The information on the exterior panel is full size, and must have sufficient brightness for easy viewing in daylight. The exterior panel 38 also may be exposed to the elements and might be positioned on a camera surface that is at least slightly curved. Panel 40, on the other hand, is inside the camera casing, is protected from direct light, and is magnified by viewfinder optics. The size of interior panel 40 typically will be much smaller than the exterior panel 38. Normally Panel 40 will be flat, so the information it presents is not distorted by the magnifying optics, and even a low level of brightness will stand out from the dark surroundings. Of course any light from the internal panel must be shielded to prevent stray light from reaching and exposing the film 22.

Viewfinder 19 includes objective and eyepiece lenses 42 and 44, respectively, on opposite sides of a beam splitter 46, preferably a half-silvered mirror. One optical path 48 through beam splitter 46 transmits a scene image to the eyepiece in the normal manner for use in pointing the camera. Another optical path 50, reflected from beam splitter 46, transmits an image of panel 40 to eyepiece lens 44. The viewfinder of FIG. 2 is a reverse Galilean type. Since the panel 40 is not in the image viewing path 48, its central section 52 may be opaque. Information intended for viewing through the eyepiece is supported on a rectangular frame 54 visible through the eyepiece and appearing to be located around its periphery. Of course alternative approaches might employ real image borders similar to frame 54 but located physically to frame the viewfinder aperture. In the latter case the central section 52 would be open or clear.

Figure 3:
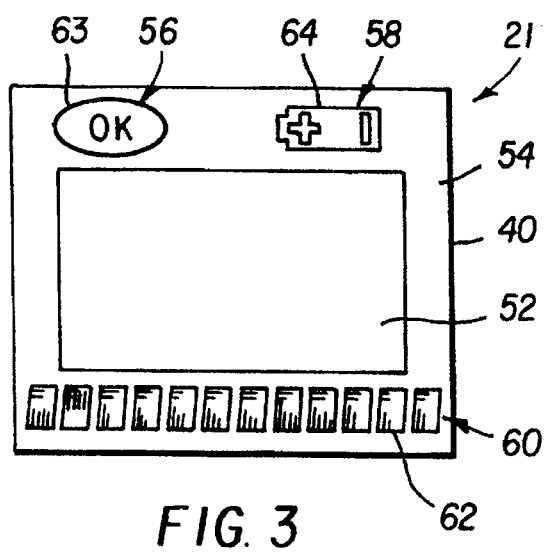
FIG. 3 is a is a front view of a display panel including both icons and an array of alpha-numeric character generators according to the preferred embodiment.
Figure 4:
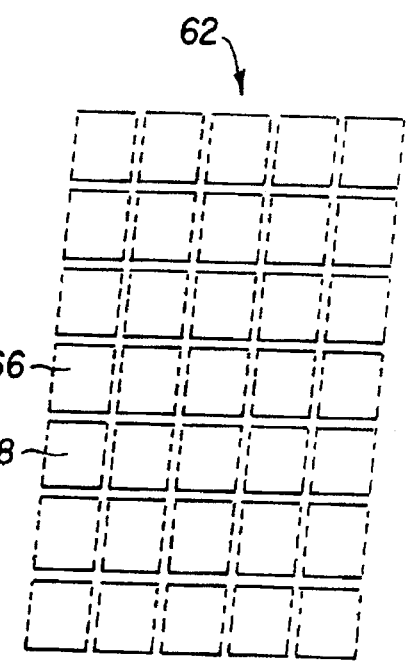
FIG. 4 is a matrix of illumination elements defining an alpha-numeric character generator according to the preferred embodiment.

As depicted in FIGS. 3 and 4, panel 40 supports multiple icons 56 and 58, across a top portion of the frame, and an in-line array 60 of alpha-numeric character generators 62 across a bottom section. The preferred number of character generators 62 is in the range of twelve to sixteen. The combination of icons and alpha-numeric generators is chosen to simplify the presentation in the viewfinder, reducing confusion from too much information. At the same time, however, the alpha-numeric generators provide the flexibility of numerous alternative messages or even instructions, when desired. Alternative embodiments and applications might use devices structurally similar to the alpha-numeric generators for producing other patterns, including icons, in addition to letters and numbers. In the preferred embodiment, however, the character generators are intended to produce words and messages, including abbreviations, and each generator can produce a multiplicity of letter and number patterns so numerous words and messages can be presented alternately in the same space across the bottom section of frame 54. Longer messages, such as instructions, might be scrolled, but camera conditions normally will be steady.

In the preferred embodiment, each icon 56 and 58 is defined by one illumination element 63 and 64, respectively, formed in a curvilinear pattern of the desired shape. Information is relayed to the camera operator by recognition of the shape of the one element. The character generators, on the other hand, employ a matrix of illumination elements of substantially the same shape, and the information is relayed through selected alternative combinations of the elements to form recognizable shapes. FIG. 4 depicts a five by seven matrix of identical rectangular illumination elements typified by 66 and 68. Of course the approaches could be reversed or combined in alternative applications, using a matrix of similar elements to produce icons, and curvilinear patterns to produce alpha-numeric characters.

It will become more apparent from the following description that the term illumination element is used to describe an element that can be selectively energized to emit light independently of other similar elements.

The illumination elements 63, 64, 66 and 68 are organic light emitting devices (OLED) according to the referenced U.S. Pat. No. 5,552,678; and VanSlyke U.S. Pat. No. 5,151,629, issued Sep. 29, 1992. The disclosures of these two patents are incorporated by reference into the present specification. The devices each include a thin film of electroluminescent material between two electrodes, an anode and a cathode. The thin film has injecting and transporting zones, one for holes adjacent the anode and another for electrons adjacent the cathode. Holes and electrons from the zones move toward each other and combine when subjected to a voltage bias across the electrodes, causing the luminescent material to emit radiation in colors depending on the particular organic materials chosen for the zones. If the film is very thin, less than approximately one micrometer (1 µm), for example, high current densities are available with relatively low resistance, providing brightness levels that are readily visible in ambient light with low applied voltages. Colors include red, green, blue, orange and numerous other variations, both additive or subtractive.

A particularly advantageous feature of OLEDs is their ability to provide multiple shapes and colors on a single substrate. A monolithic device can be constructed by masking the substrate and depositing appropriate OLED materials in different areas to emit in the desired colors, all on a single substrate.

The above-referenced application describes an improvement that applies forward and reverse biasing to the OLEDs. Such an approach would not be required in a camera, where the periods of use are short. For the purpose of the present specification, only a forward bias is used during normal operation.

According to the present invention the illumination elements comprise organic electroluminescent material coupled to an electrode and isolated electrically from other elements so a voltage can be applied selectively to alternative elements causing the selected element to luminesce. The illumination elements also may be provided in one or more groups of elements with the electroluminescent material in some groups chosen to emit light in a first color and electroluminescent materials in other groups chosen to emit light in a second different color. Colors then can be combined with shapes and patterns to relay information depending on its relative importance. Red or orange might be used for more critical information, for example.

Figure 5:
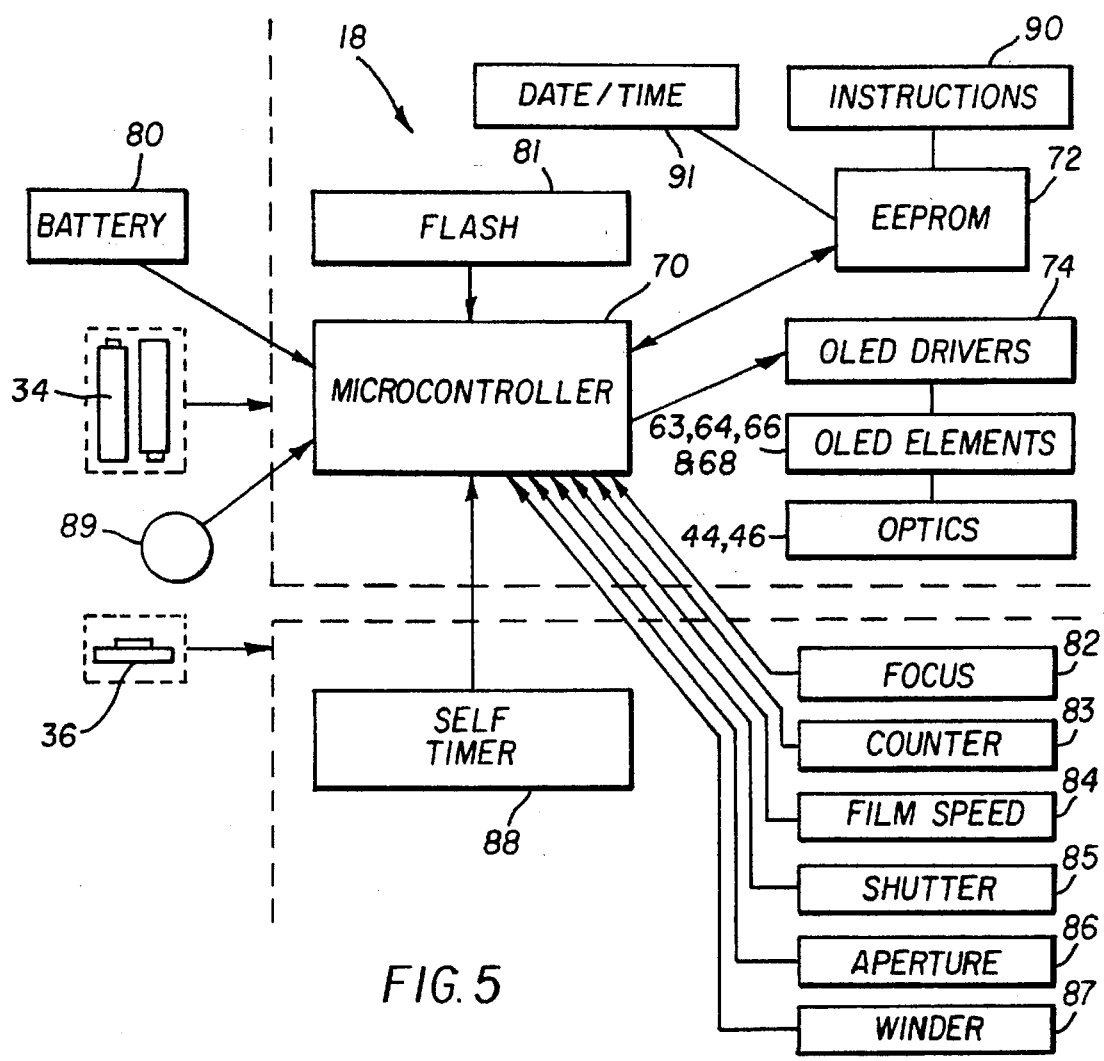
FIG. 5 is a block diagram representing sensing and control mechanisms according to the preferred embodiment.
Figure 6:
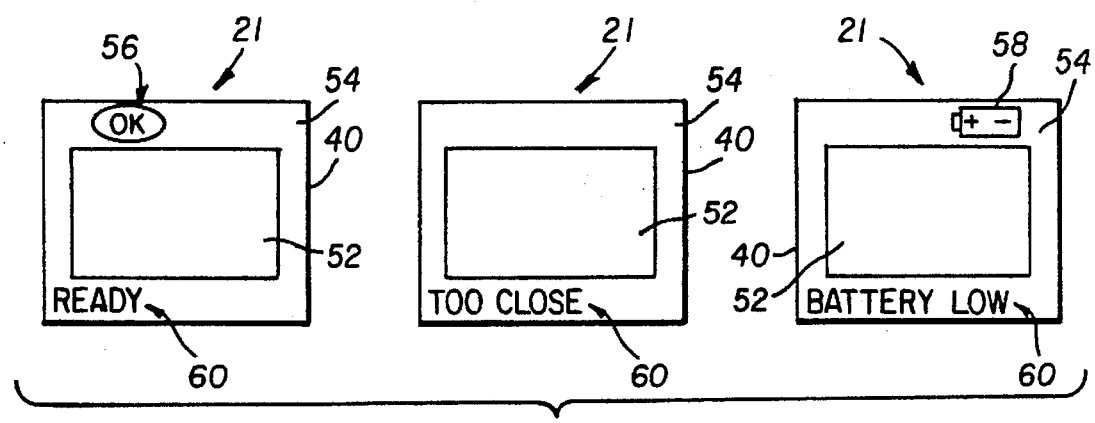
FIG. 6 is a view of three alternative states of the information display representing different photographic condition.

FIGS. 5 and 6 depict the control 18 and its operation for relaying information regarding photographic conditions through visible icons and alpha-numeric messages on the displays 20 and 21. The control includes a microcontroller 70, appropriate memory 72, drivers 74 and numerous sensing and input devices 80 through 89.

The sensors and inputs 80–89 measure various parameters representing photographic conditions. Examples include battery life 80; flash information 81, including mode for full or fill flash and charging cycle progress; focus settings 82, including mode for manual or automatic focus; film counter 83, including the total number of frames and frames remaining; film speed 84; shutter and aperture settings 85 and 86, including exposure mode for programmed operation, aperture priority or shutter priority; winder operation 87, including modes for forward film advance and rewind; self-timer status 88, including "on" and time remaining; and ambient light conditions as measured by a photocell 89. Various sets of instructions 90, and date and time stamps 91, also are stored for input to microcontroller 70 when needed.

In addition to reporting on sensed conditions and camera settings, the display might provide alternative format and centering marks for use in camera pointing. Examples include illuminated masks selected alternatively to define the image perimeter with wide-angle, telephoto and close-up optics. Similar approaches can be used for parallax correction.

Microcontroller 70 selects inputs, such as those described above, and determines appropriate messages to be displayed on panels 38 and 40. The microprocessor controls drivers 74, which selectively energize the illumination elements 63, 64, 66 and 68 by applying a voltage to their electrodes. Brightness can be adjusted by changing the applied power as a function of the ambient light conditions to enhance viewability of the display. In the case of icons 56 and 58, the shape of the icon relays the message information. In the case of character generators 62, combinations of illumination elements 66 and 68 collectively define the characters and combinations of the devices collectively define words and messages. Examples are depicted in FIG. 6, which includes alternative messages provided by the same character generators.

FIGS. 7 and 8 depict the panel 40 supported on a substrate 92 including electrical contacts 94. The panel is thin and flat and can be manufactured with modern techniques for depositing multi-layered materials on a substrate. Masks are used to define the shapes. The layered material, including the organic electroluminescent material, is vacuum deposited one layer after another.

FIG. 9 illustrates a first alternative embodiment that is similar to the preferred embodiment but includes alternative matrix shapes, patterns and icons. The FIG. 9 display is intended for surface mounting on the exterior of the camera casing. Features on FIG. 9 that are similar to the preferred embodiment are identified by adding one hundred to the reference numbers used in FIGS. 1–8.

Figure 10:
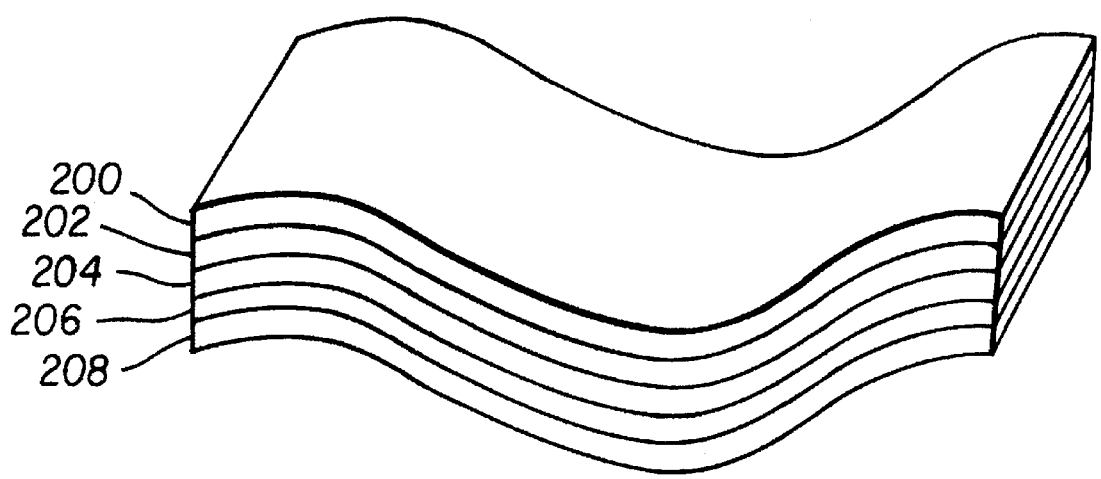
FIGS. 10 and 11 are schematic views of second alternative embodiments of the invention depicting curved displays adapted to conform to the exterior surfaces of the camera casing.
Figure 11:
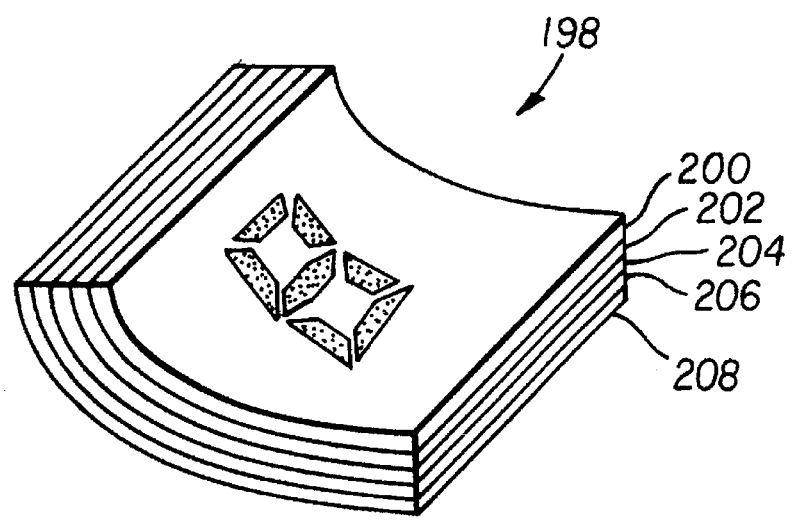

FIGS. 10 and 11 depict a method and second alternative embodiment of the invention, including a curved information display 198, adapted as an exterior display conforming to curved surfaces of the camera casing. According to the method, organic electroluminescent material is applied in predetermined patterns to a flexible support, and the flexible support is applied to a rigid support, such as the camera casing or other structure conforming to the shape of the camera casing. The electroluminescent patterns are then coupled electrically to a camera control for selectively applying voltages to the patterns, causing the patterns to luminesce. Of course the material also could be applied directly to the rigid layer without the intermediate step using the flexible layer. The electroluminescent material would then be applied to a substrate that is formed to define or otherwise conform to the shape of the surfaces of camera casing.

Referring to FIGS. 10 and 11, the transparent flexible substrate is identified at 200. Layers 202, 204 and 206 comprise a first transparent conductor, an organic electroluminescent pattern layer, and a second transparent conductor, respectively, coated or otherwise deposited on the flexible substrate. A sealing layer 208 may be applied for mechanical and environmental protection. The desired patterns of the electroluminescent material can be applied through a number of known techniques including vapor deposition or casting. Examples of materials and solutions suitable for casting are disclosed, for example, in International Publication No. WO 92/16023.

Figure 12:
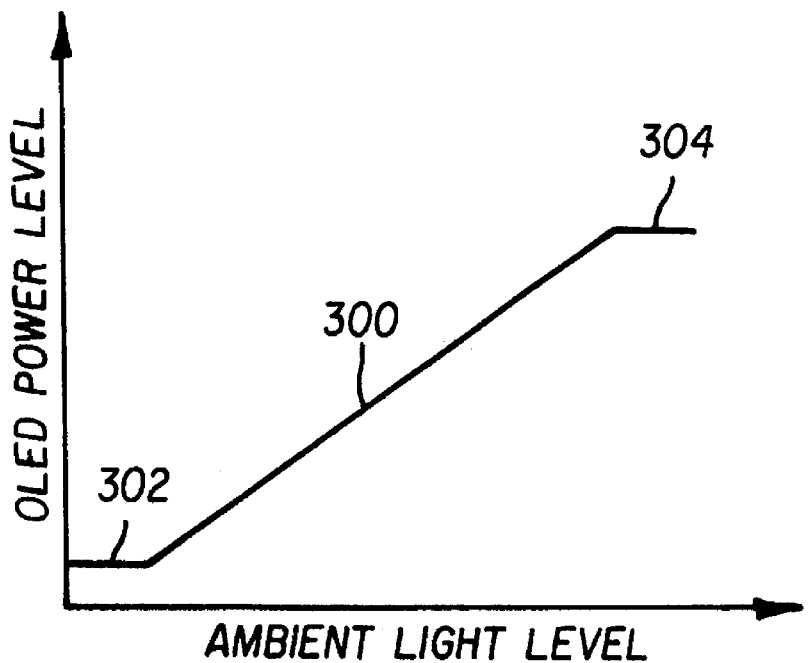
FIGS. 12–15 are graphs representing third alternative embodiments of the invention in which the intensity of the display is adjusted to optimize the presentation of the displayed information.
Figure 13:
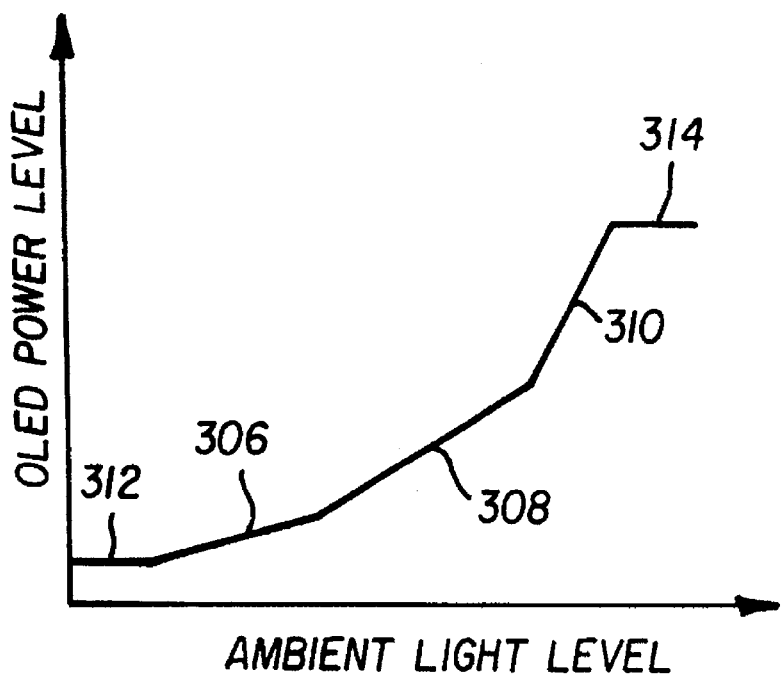
Figure 14:
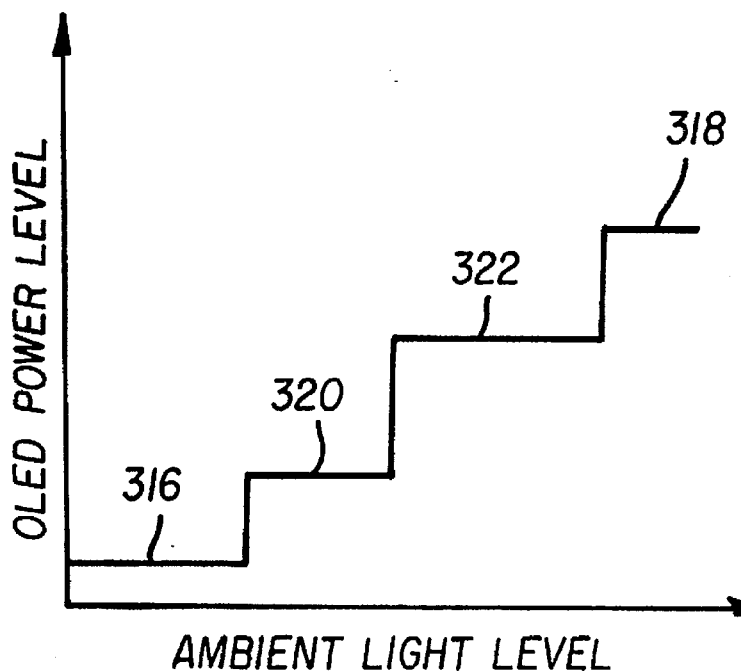

Referring now to FIGS. 12–14, alternative embodiments of the invention are depicted in which the brightness of the organic electroluminescent elements of the display is controlled as a function of ambient illumination, either scene illumination in the viewfinder or illumination in the vicinity of an external display. Display brightness is controlled by sensing the intensity of ambient illumination with a photocell 89 shown in FIG. 5 and adjusting the power applied to the display elements as a function of the intensity sensed by the photocell.

FIG. 12 depicts an alternative where the power to the organic light emitting elements is varied as a linear function 300 of the ambient light intensity with a minimum power 302 and a maximum power 304.

FIG. 13 depicts an alternative where the power to the organic light emitting elements is varied as a function of ambient light intensity in several distinct regions 306, 308, and 310. The adjustment is linear in all of the regions, but the slope is different. The slope is horizontal or flat in minimum and maximum regions 312 and 314, respectively.

FIG. 14 depicts another alternative where the power to the organic light emitting elements is varied as a step function of ambient light intensity, including minimum and maximum steps 316, and 318, respectively, and a plurality of steps 320, and 322 between said minimum and maximum.

Figure 15:
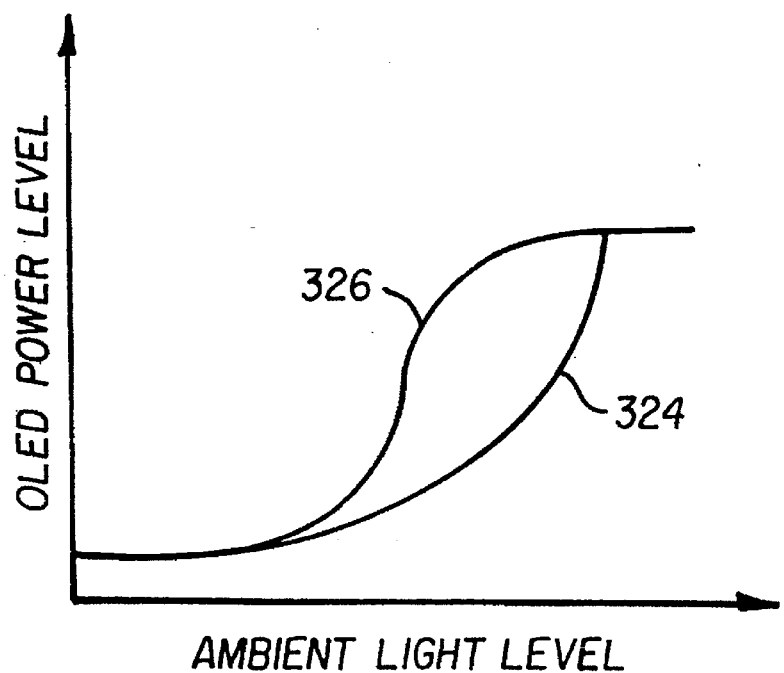

FIG. 15 depicts still another alternative where the power is varied as a non-linear function, either exponential 324 or sinusoidal 326.

While the invention is described in connection with preferred and alternative embodiments, other modifications and applications will occur to those skilled in the art. The claims should be interpreted to fairly cover all such modifications and applications within the true spirit and scope of the invention.

PARTS LIST FOR FIGURES

| Reference No. | Part |
| --- | --- |
| 10. | Camera. |
| 12. | Film advancing mechanism. |
| 14. | Exposure mechanism. |
| 16. | Power source. |
| 18. | Logic & control unit. |
| 19. | Viewfinder. |
| 20. | Information display. |
| 21. | Information display. |
| 22. | Film |
| 24. | Supply chamber. |
| 26. | Take-up chamber. |
| 30. | Optics. |
| 32. | Shutter. |
| 34. | Batteries. |
| 36. | Batteries. |
| 38. | Panel. |
| 40. | Panel. |
| 42. | Objective lens. |
| 44. | Eyepiece lens. |
| 46. | Beam splitter. |
| 48. | Optical path. |
| 50. | Optical path. |
| 52. | Central section. |
| 54. | Frame. |
| 56. | Icon. |
| 58. | Icon. |
| 60. | Array. |
| 62. | Character generator. |
| 63. | Illumination element. |
| 64. | Illumination element. |
| 66. | Illumination element. |
| 68. | Illumination element. |
| 70. | Microcontroller. |
| 72. | Memory. |
| 74. | Drivers. |
| 80. | Battery input. |
| 81. | Flash input. |
| 82. | Focus input. |
| 83. | Counter input. |
| 84. | Speed input. |
| 85. | Shutter input. |
| 86. | Aperture input. |
| 87. | Winder input. |
| 88. | Timer input. |
| 89. | Photocell. |
| 90. | Instructions input. |
| 91. | Date & time input. |
| 92. | Chip set. |
| 94. | Contacts. |
| 198. | Curved display. |
| 200. | Transparent substrate. |
| 202. | Transparent conductor. |
| 204. | Electroluminescent material. |
| 206. | Conductor. |
| 208. | Sealing substrate. |
| 300. | Linear function. |
| 302. | Minimum. |
| 304. | Maximum. |
| 306–310. | Regions. |
| 312. | Minimum. |
| 314. | Maximum. |
| 316. | Minimum step. |
| 318. | Maximum step. |
| 320–322. | Steps. |
| 324. | Exponential function. |
| 326. | Sinusoidal function. |

What is claimed is:

1. A photographic camera, comprising:

a casing having a curved exterior surface;

an information display mounted on said curved exterior surface, said display comprising a substrate curved to match said curved exterior surface and a layer of organic electroluminescent material applied to said curved substrate in a pattern to define said information;

a control within said casing; and means coupling said display to said control for applying voltages to said pattern to cause said pattern of material to luminesce to display said information.

2. A camera according to claim 1, wherein said substrate is flexible and is flexed to match said curved exterior surface.

3. A camera according to claim 1, wherein said substrate is rigid.

4. A camera according to claim 1, wherein said substrate comprises a rigid layer shaped to match said curved exterior surface and a flexible layer applied to said rigid layer, said material being applied to said flexible layer.

5. A camera according to claim 1, wherein said pattern defines individual shapes representing said information.

6. A camera according to claim 1, wherein said pattern defines individual illumination elements which collectively define said information.

7. A camera according to claim 1, wherein said pattern includes first and second groups of illumination elements, said first group including electroluminescent material which emits light of a first color and said second group including electroluminescent material which emits light of a second color.

8. A camera according to claim 1, wherein said pattern defines individual icons representative of camera conditions.

* * * * *